C. A. OMEN.
AUTOMOBILE DUMP BODY.
APPLICATION FILED MAY 29, 1918.
1,328,890.
Patented Jan. 27, 1920.
3 SHEETS—SHEET 3.
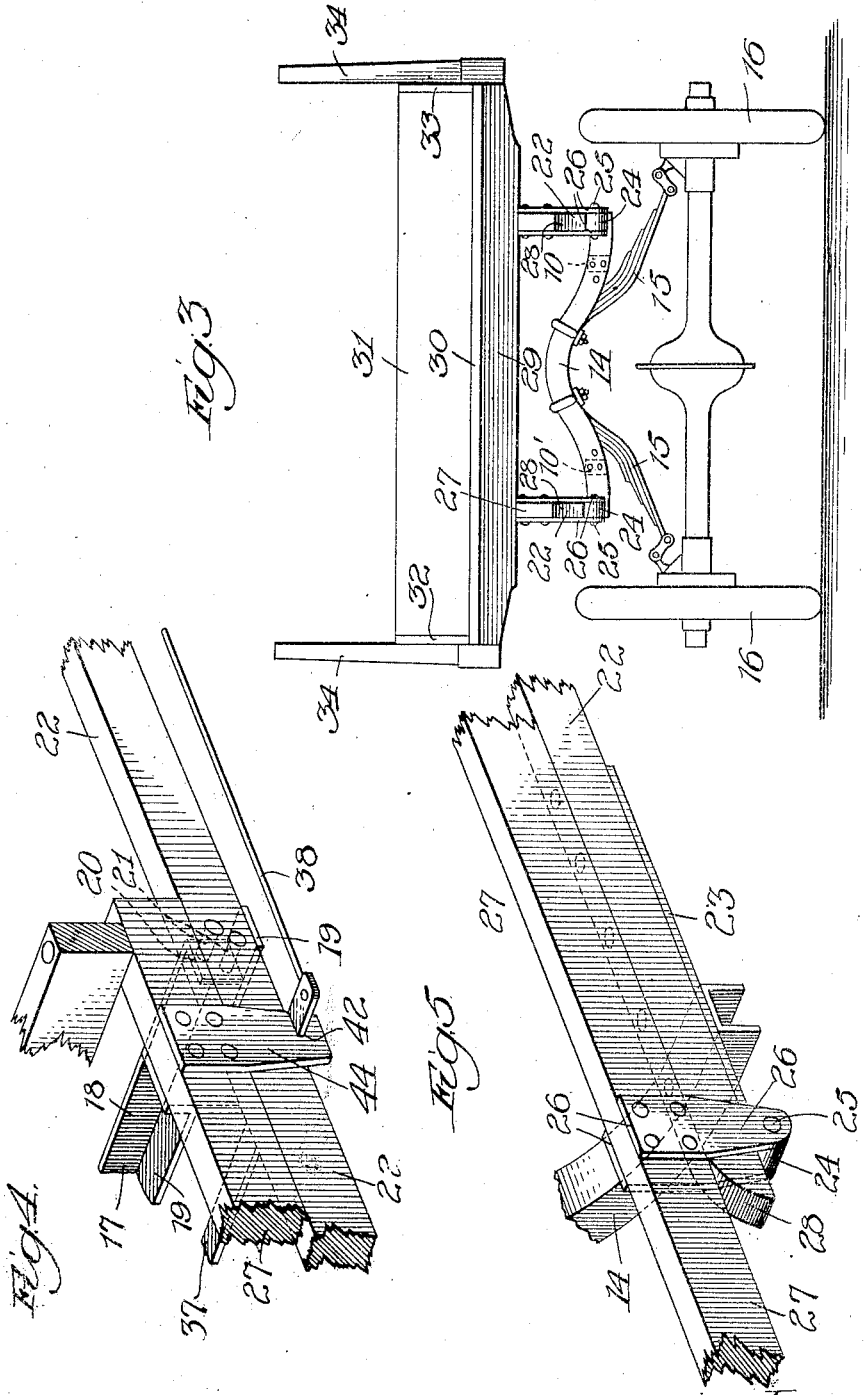
Inventor:
Charles A. Omen,
By Dyrenforth, Lee, Chritton & Wiles,
Attys.

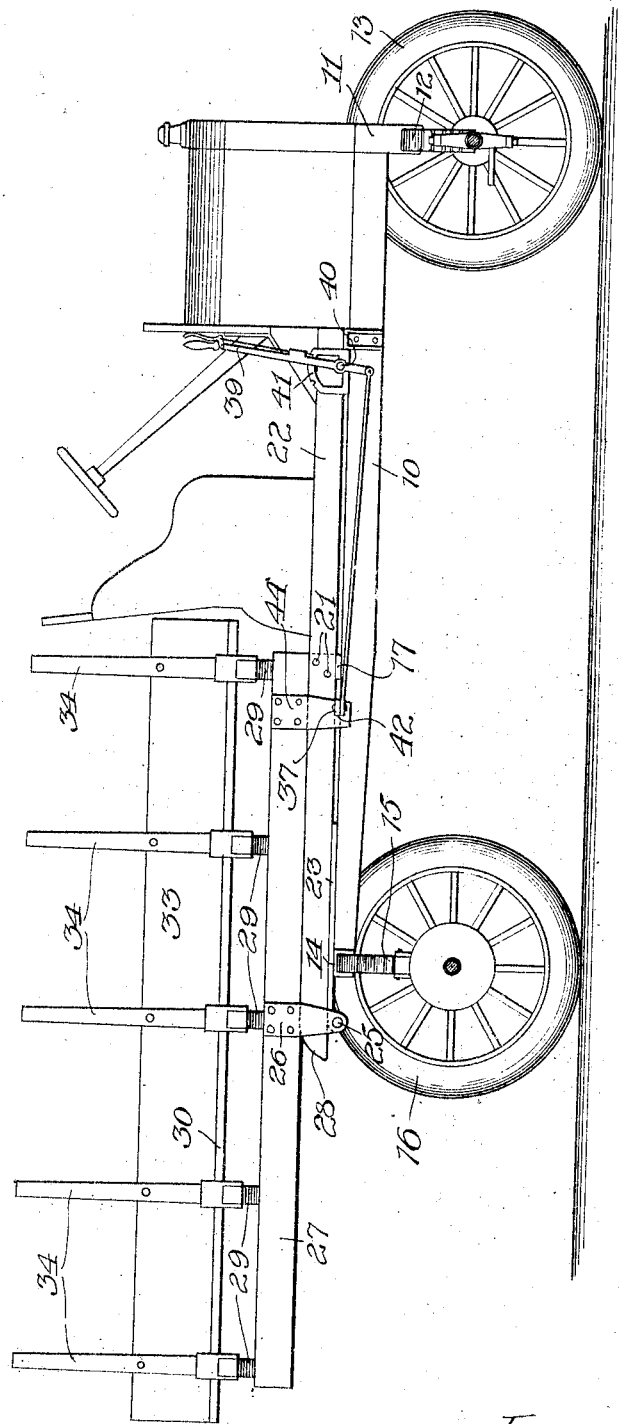

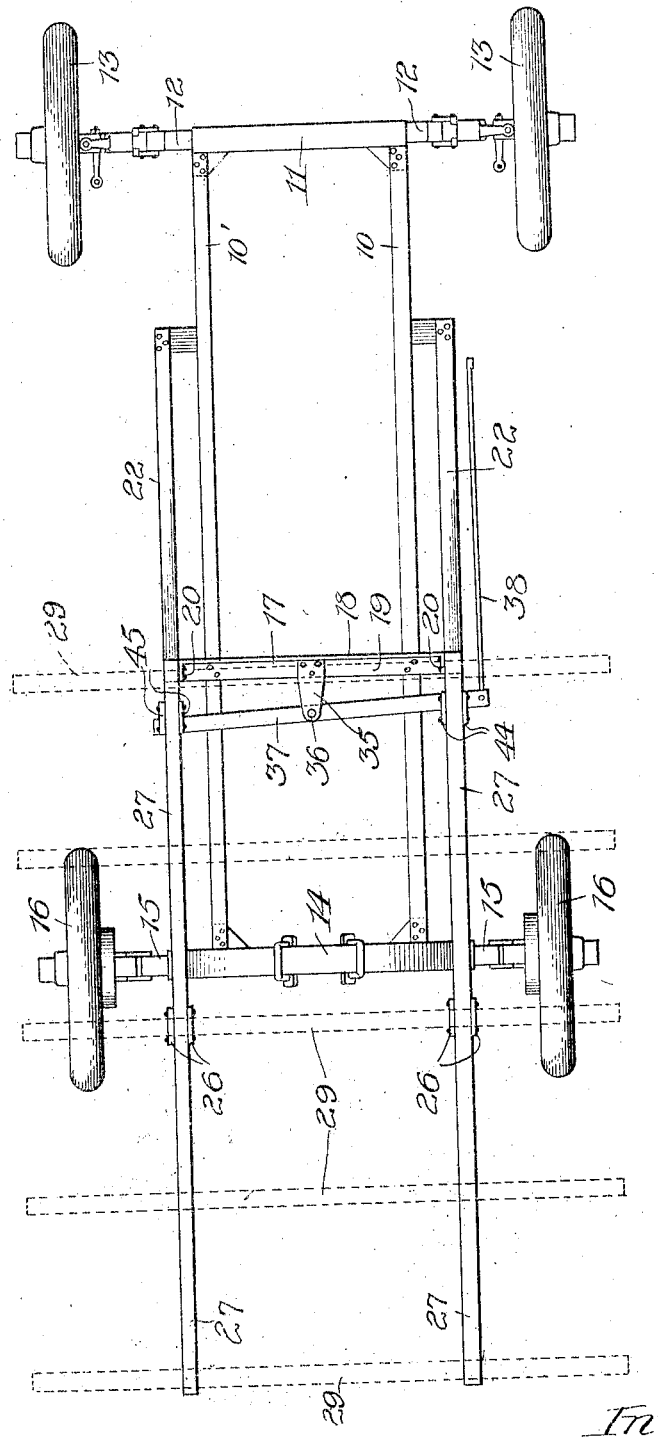

UNITED STATES PATENT OFFICE.

CHARLES A. OMEN, OF PRINCETON, ILLINOIS.

AUTOMOBILE DUMP-BODY.

1,328,890. Specification of Letters Patent. Patented Jan. 27, 1920.

Application filed May 29, 1918. Serial No. 237,210.

*To all whom it may concern:*

Be it known that I, CHARLES A. OMEN, a citizen of the United States, residing at Princeton, in the county of Bureau and State of Illinois, have invented a new and useful Improvement in Automobile Dump-Bodies, of which the following is a specification.

This invention relates to an improved dump-body, which, though it can be applied to other wheel-supported frames, is more particularly designed for attachment to the chassis of an automobile.

The main object of the invention is to provide for equipping the chassis of an automobile with an improved dump-body which is simple in construction and operation, and which may be readily applied to the chassis, thereby converting the machine to truck or delivery purposes.

The invention is illustrated, in its preferred embodiment, in the accompanying drawings, in which—

Figure 1 is a side elevational view of an automobile chassis equipped with the improved dump-body; the wheels at the near side being removed and the axle shown in section; Fig. 2 is a plan view of the chassis and a portion of the dump-body; Fig. 3 is a rear end elevational view of the auto-truck with the improved dump-body; Fig. 4 is a broken perspective in the nature of a transparent view of a portion of the chassis and dump-body; and Fig. 5 is a broken perspective view of a portion of the chassis and dump-body.

The chassis of the automobile may be of the usual or any suitable construction; that shown comprising the longitudinal girders 10 and 10¹ which have their forward ends secured to the cross-piece 11 mounted on the leaf-spring 12 carried by the front pair of wheels 13, and which girders have their rear ends secured to the cross-piece 14 mounted on the leaf-spring 15 carried by the rear pair of wheels 16.

The improved dump-body, as applied to the automobile chassis, will now be described. To the longitudinal girders 10 and 10¹ is suitably secured the cross-piece 17 which preferably consists of angle-iron. Near the ends of the cross-piece 17 the vertical flange 18 is cut at its juncture with the horizontal flange 19 and bent rearwardly to provide the brackets 20 which support and to which are secured by bolts 21 the intermediate portions of the longitudinal sills 22. The latter have their rear end portions suitably secured to the cross-piece 14 and are provided on their undersides with the bars 23 formed to provide the pivot-bearings 24. To pivots 25 in the bearings 24 are connected the lower end portions of the vertical arms 26 which latter have their upper end portions suitably secured to the central portion of the longitudinal beam 27 which are on the lower part of the load receptacle. The beams 27 have the forward half portions thereof normally resting on the longitudinal sills 22, and they have their rear half portions extending rearwardly beyond the rounded rear ends 28 of the longitudinal sills 22 (see Fig. 1). To the longitudinal beams 27 are suitably secured the cross-beams or joists 29 on which are mounted the floor 30, the front board 31, the side boards 32 and 33, and the side stakes 34, of the load receptacle. The cross-piece 17 has secured thereto the bracket 35 to which is connected by the pivot 36 the bar 37 which is pivotally connected to one end of the rod 38 which latter has its other end pivotally connected to the lower end of the operating lever 39 which is mounted on the pivot 40 on the quadrant 41. The lever 37 is movable into or out of the notches 42 which are provided in the lower end portions of the plates 44 and 45 which latter have their upper end portions suitably secured to the forward end portions of the longitudinal beams 27.

From the foregoing, the construction, operation and advantages of the improved dump-body will be readily understood. By operation of the lever 39 the bar 37 may be moved into the notches 42 to hold the forward portion of the longitudinal beams 27 of the load receptacle down against the sills 22 or may be released to permit the said forward portion of the longitudinal beams of the load-receptacle to swing upwardly from said sills 22. The pivotal connection of the longitudinal sills 22 to the central portion of the longitudinal beams 27, which carry the load receptacle permit of easy operation of the dump-body. When the weight of the load in the rear half of the load receptacle exceeds the weight of the load in the forward half of the load receptacle, the latter is self-dumping through the action of gravity.

The foregoing detailed description has been given for clearness of understanding only—wherefore no unnecessary limitations should be understood therefrom, but the appended claims should be construed as broadly as permissible in view of the prior art.

What I regard as new and desire to secure by Letters Patent is:

1. The combination with a truck-chassis frame provided with longitudinal members and with a rear cross-bar connected therewith, of a forward cross-bar mounted on intermediate portions of said longitudinal members, longitudinal sills mounted on said cross-bars, longitudinal beams resting on said sills and projecting rearwardly beyond the same, pivotal connection between the intermediate portions of said beams and the rear ends of said sills, means releasably locking the front end of said beams to said sills, and a load-receptacle wholly carried by said beams.

2. The combination with a truck-chassis frame provided with longitudinal members and with a rear cross-bar connected therewith, of an angle-form cross-bar mounted on intermediate portions of said longitudinal members and projecting beyond the same, said forward cross-bar having a vertical flange incised at the end portions thereof and bent at right angles to the cross-bar, longitudinal sills mounted on said rear cross-bar and on the projecting end portions of the horizontal flange of said forward cross-bar and secured to the bent portions of the vertical flange of the forward cross-bar, longitudinal beams resting on said sills and projecting rearwardly beyond the same, arms depending from the intermediate portions of said arms and having pivotal connections with the rear end portions of said sills, arms depending from the forward end portions of said beams and embracing said sills, said last-named arms being provided with latching notches disposed below the plane of said sills, a latch-lever pivotally mounted on the forward cross-bar and engaging said notches, and means for actuating said latch-bar.

3. The combination with a truck-chassis frame provided with longitudinal members and with a rear cross-bar connected therewith, of a forward cross-bar mounted on intermediate portions of said longitudinal members and having end portions projecting beyond the same, longitudinal sills mounted on said rear cross-bar and on the projecting end portions of said forward cross-bar, longitudinal beams resting on said sills and projecting rearwardly beyond the same, pivotal connections between the intermediate portions of said beams and the rear ends of said sills, arms depending from the front portions of said beams and embracing said sills and provided below the plane of said sills with notches, a centrally pivoted latch-bar disposed below the plane of said sills and engaging said notches, an actuating lever mounted on the front portion of the chassis, and a rod connecting said lever with said latch-bar.

CHARLES A. OMEN.